J. BREWER.
WIRE AND DRILL GAGE.
APPLICATION FILED FEB. 12, 1920.
1,389,486. Patented Aug. 30, 1921.
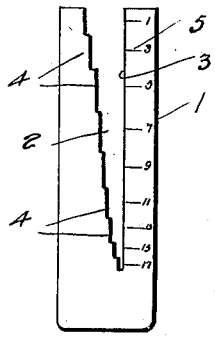
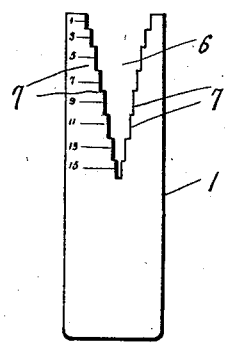
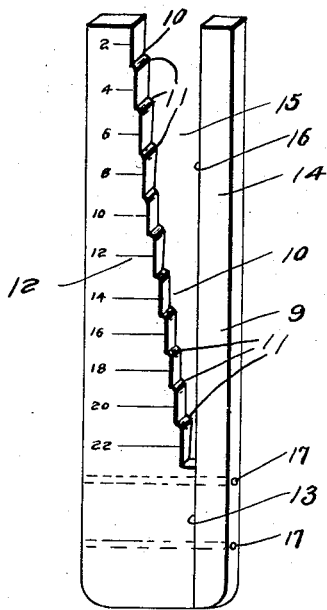
Inventor
J. Brewer,
Attorney

UNITED STATES PATENT OFFICE.

JOSEPH BREWER, OF NEW YORK, N. Y.

WIRE AND DRILL GAGE.

1,389,486.

Specification of Letters Patent.   Patented Aug. 30, 1921.

Application filed February 12, 1920. Serial No. 358,179.

*To all whom it may concern:*

Be it known that I, JOSEPH BREWER, a citizen of the United States, residing at New York, in the county of Bronx and State of New York, have invented certain new and useful Improvements in Wire and Drill Gages; and I do hereby declare the following to be a full, clear, and exact description of the invention, such as will enable others skilled in the art to which it appertains to make and use the same.

This invention relates to new and useful improvements in gages or measuring instruments and has for its primary object the provision of means, whereby the gage of a device or article, which may be wire, drills, sheet materials, and the like, can be easily and quickly determined or obtained.

Another object of this invention is the provision of a member or body having a slot with a plurality of restrictions, forming said slot into different widths, so that on passing an article along said slot as far as possible, the gage of said article can be then readily determined by referring to a scale on said member or body.

A further object of this invention is the provision of a gage or measuring instrument of the above stated character, which shall be simple, durable, and efficient, and which may be manufactured with considerable ease and sold at a comparatively small cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description, and accompanying drawing, in which:—

Figure 1 is a front elevation of a gage or measuring instrument constructed in accordance with my invention, Fig. 2 is a front elevation, illustrating a modified form of my invention, Fig. 3 is a perspective view, illustrating another modified form of my invention, Fig. 4 is a similar view illustrating a further modified form of my invention, Fig. 5 is a fragmentary front elevation, illustrating means of closing the slot when the gage is made of considerable length.

Referring in detail to the drawing, the numeral 1 indicates a body, having a slot 2 that opens out of one end of said body and extends to a point adjacent the other end thereof and the wall 3 of the slot is disposed straight while the other wall has a plurality of projections or shoulders 4 arranged in step formation so as to form various widths with said slot. The slot decreases in width progressively from one end in the direction of the other end, so that articles of different gages or sizes can be inserted in said slot from its open end and passed along the same until wedged or fitted tightly between the walls thereof. Each shoulder or projection has a straight face and which face is in length approximately two-thirds of the diameter or thickness of the article which is positioned between the same and the wall 3 of the slot.

A scale 5 is arranged along the slot on the body 1 and the characters thereof register with the shoulders or projections, so that when an article is properly fitted between a certain shoulder and the wall 3 of said slot, the respective character to said shoulder indicates the gage of said article.

From the foregoing description taken in connection with the accompanying drawing, it will be noted how simple the device can be handled and the efficiency in which the gage of an article can be determined, simply by holding the body in one hand and the article in the other hand and moving said article along the slot until it fits snugly between a shoulder 4 and the wall 3 of said slot and then referring to the scale and noting the character opposite to the respective shoulder will give the correct gage of the article with great speed and accuracy.

Referring to Fig. 2 which illustrates a modified form of my invention, the body 1 is provided with a slot 6 which opens out at one end of said body so as to readily receive a cylindrical article and each wall thereof has oppositely disposed shoulders 7 arranged in step formation which forms said slot into various widths for measuring articles of different gages. A scale 8 is arranged along the slot on the body and the characters thereof register with the shoulders.

Referring to Fig. 3 which illustrates another modified form of my invention, the body 9 has one side wall cut in step formation which defines shoulders 10, the corners 11 of which are rounded, so as not to injure or mutilate the article being measured, when said article is of a fragile construction or material. The shoulders 10 have registering therewith characters of a scale 12 and said shoulders extend from one end of the body 9 to a point adjacent the other end, which defines a straight side face 13 to be engaged by a strip 14 which extends parallel with the body to form a slot 15 with an open end to receive the article to be measured, and which article is passed along the slot until it fits against the straight wall 16 of the strip 14 and one of the shoulders 10. The strip 14 is secured to the body 9 by rivets 17 or by bolts or other fasteners.

Referring to Fig. 4 which illustrates a further modified form of my invention, a pair of bodies 18 have positioned between the same a strip 19 having straight faces 20. The inner side faces of the bodies 18 have formed thereon a plurality of shoulders or projections 20' that are arranged in step formation and extend from one of the ends of the bodies to a point adjacent the other ends and the bodies coöperate with the strip 19 in defining slots 21, and the shoulders or projections 20' form said slots into different widths for the purpose of measuring different size articles.

The shoulder or projections of one of the bodies 18 may vary in size or the distance spaced from the strip from that of the shoulders of the other body so as to provide a device with a larger measuring capacity. Scales 22 and 23 are arranged along the bodies 18 and the characters thereof vary and are alined with the shoulders or projections of said body. The bodies and strips 19 may be secured together in any desired manner or by a band 24.

A handle 25 is formed on a substantially U-shaped member 26 which is constructed from channeled material so as to slidably receive one of the ends of the bodies 18 and one of the ends of the strips 19, and said substantially U-shaped member 26 is adapted to frictionally engage said part so as to secure the handle 25 thereto.

When the gage or measuring instrument is made of a considerable length, a connecting member 27 is provided, which is adapted to be secured to the bifurcated end of the body by means of fastening elements 28 so as to prevent accidental spreading of the bifurcated portion of said body.

While I have shown and described the preferred embodiment of my invention, it will be understood that minor changes in construction, combination and arrangement of parts may be made without departing from the spirit and scope of the invention as claimed.

Having thus described my invention what I claim is:—

1. A measuring instrument comprising a pair of flat bodies, each having a plurality of shoulders formed along one of its longitudinal edges and arranged in step formation and terminating short of one end of the body, a strip positioned between said bodies and coöperating with the shoulders in defining slots of different widths throughout their lengths, and means securing the bodies and strips together.

2. A measuring instrument comprising a pair of elongated bodies, there being shoulders formed along one of its longitudinal edges and arranged in step formation, a strip positioned between said bodies and having straight faces and coöperating with the shoulders in defining slots of different widths throughout their lengths, means securing the bodies and strips together, there being scales arranged along the bodies, a substantially U-shaped member secured to the body and a handle for said member.

3. A measuring instrument comprising an elongated body having a bifurcated end, there being a plurality of shoulders arranged in step formation along the bifurcated portion of the body to define a slot of different widths, and means connecting the ends of the furcations of said body together.

4. A measuring instrument comprising an elongated body having a bifurcated end, there being a plurality of shoulders arranged in step formation along the bifurcated end of said body to define a slot of different widths, and an element secured to the body and closing the ends of the furcations thereof.

In testimony whereof I affix my signature in presence of two witnesses.

JOSEPH BREWER.

Witnesses:
  H. STEINER,
  A. BREWER.